(12) United States Patent
Yavuz et al.

(10) Patent No.: US 9,661,492 B2
(45) Date of Patent: May 23, 2017

(54) WIRELESS DEVICE, NETWORK NODE, AND METHODS THEREIN FOR SENDING A MESSAGE COMPRISING ONE OR MORE POPULATED FIELDS

(71) Applicant: Telefonaktiebolaget L M Ericsson (publ), Stockholm (SE)

(72) Inventors: Emre Yavuz, Stockholm (SE); Gunnar Bergquist, Kista (SE); Walter Müller, Upplands Väsby (SE); Kai-Erik Sunell, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/771,728

(22) PCT Filed: Jul. 13, 2015

(86) PCT No.: PCT/SE2015/050819
§ 371 (c)(1),
(2) Date: Aug. 31, 2015

(87) PCT Pub. No.: WO2016/022053
PCT Pub. Date: Feb. 11, 2016

(65) Prior Publication Data
US 2016/0205542 A1    Jul. 14, 2016

Related U.S. Application Data

(60) Provisional application No. 62/035,132, filed on Aug. 8, 2014, provisional application No. 62/055,700, filed on Sep. 26, 2014.

(51) Int. Cl.
*H04W 8/24* (2009.01)
*H04W 4/00* (2009.01)
*H04W 72/12* (2009.01)

(52) U.S. Cl.
CPC ............ *H04W 8/24* (2013.01); *H04W 4/005* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 2011/0103372 A1* | 5/2011 | Shatsky | H04L 65/1016 370/352 |
| 2011/0103373 A1* | 5/2011 | Shatsky | H04L 65/1016 370/352 |
| 2013/0230042 A1* | 9/2013 | Shatsky | H04L 65/1016 370/352 |

FOREIGN PATENT DOCUMENTS

WO    2015142083 A1    9/2015

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.2.1, Jun. 2014, 1-57.

(Continued)

*Primary Examiner* — Diane Mizrahi
(74) *Attorney, Agent, or Firm* — Murphy, Bilak & Homiller, PLLC

(57) ABSTRACT

A method performed by a wireless device (130) for sending a message comprising one or more populated fields (704, 801, 901) to a network node (110). The wireless device (130) and the network node (110) operate in a wireless communications network (100). The wireless device (130) populates (701) one or more fields (704, 801, 901) comprised in an existing message to be sent to the network node (110) with an indication of a restriction of the wireless device (130). The wireless device (130) also sends (702) the message comprising the one or more populated fields (704, (Continued)

801, 901) to the network node (110) prior to an enquiry or a fetching of category and capability information of the wireless device (130) by the network node (110).

32 Claims, 11 Drawing Sheets

(56) References Cited

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.2.0, Jun. 2014, 1-365.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.2.0, Jun. 2014, 1-215.

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.2.0, Jun. 2014, 1-57.

Unknown, Author, "Capability report for low cost MTC UEs", Huawei, HiSilicon, 3GPP TSG-RAN WG2 #86, R2-142070, Seoul, Korea, May 19-23, 2014, 1-3.

Unknown, Author, "Indication of category for low complexity UEs", Change Request, Ericsson, 3GPP TSG-RAN WG2 Meeting #87, R2-143331, Dresden, Germany, Aug. 18-22, 2014, 1-5.

Unknown, Author, "Necessity on category 0 indication to network before UE capability delivery", NSN, Nokia Corporation, 3GPP TSG-RAN WG2 Meeting #86, R2-142474 Seoul, Korea, May 19-23, 2014, 1-5.

Unknown, Author, "On necessity of differentiating Cat 0 UEs and legacy UEs", Huawei, HiSilicon, 3GPP TSG RAN WG1 Meeting #77, R1-141941, Seoul, Korea, May 19-23, 2014, 1-3.

Unknown, Author, "TBS limitation and indication of category for low complexity UEs", Ericsson, 3GPP TSG-RAN WG2 #87, R2-143332, Dresden, Germany, Aug. 18-22, 2014, 1-6.

\* cited by examiner

R/R/E/LCID sub-header a)

R/R/E/LCID/F/L sub-header with
7-bits L field b)

R/R/E/LCID/F/L sub-header with
15-bits L field

WIRELESS DEVICE, NETWORK NODE, AND METHODS THEREIN FOR SENDING A MESSAGE COMPRISING ONE OR MORE POPULATED FIELDS

TECHNICAL FIELD

The present disclosure relates generally to a first device and methods therein for sending a message comprising one or more populated fields to a second device. The present disclosure also relates generally to a second device and methods therein for determining a restriction of a first device. The present disclosure further also relates generally to computer programs and computer-readable storage mediums, having stored thereon the computer programs to carry out these methods.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular network. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which may be divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Some of the current standardization procedures are focused on providing for standards for low cost UEs. In agreement with this, the objective of the 3GPP Release (Rel)-12 work item on "Low cost & enhanced coverage Machine-Type Communications (MTC) UE for LTE" is to specify a new low complexity UE type with the following complexity reduction techniques: a) Single receive antenna, b) DL and UL maximum Transport Block Size (TBS) of 1000 bits, and c) Half duplex operation, optional.

Because such a low complexity UE may have restrictions in its operation, such as the TBS restriction just mentioned, it may need to inform the network, e.g., its serving network node, of its capability/ies. In the particular context of the Radio Resource Control (RRC) procedure, the existing working assumption is that the UE does not indicate its low complexity capability in Msg1, Preamble, nor in the Radio Resource Control (RRC) context of Msg3-RRCConnection-Request- or Msg5-RRCConnectionSetupComplete-.

A low complexity UE supporting only 1000 bit UL TBS may restrict its Buffer Status Report (BSR), a Medium Access Control (MAC) control element, to less than 1000 bit until having provided the UE capabilities to the eNB or having received the first RRCConnectionReconfiguration message, so that the network may restrict all UL grants accordingly.

Once the network is informed that the UE is a low complexity UE, it may be possible for the UE to report a value greater than 1000 bit if there is data in the buffers even though the network may restrict the UL grants accordingly. This is because a low complexity UE may have more than 1000 bits in the buffer, even if it may only send/receive up to 1000 bits at a time.

However, under the current working assumption, a UE with restrictions in its operation may still receive grants it may not handle, and experience a communication failure.

SUMMARY

It is therefore an object of embodiments herein to improve the way in which an indication of a restriction of a wireless device, such as a UE, is provided to a network node, such as an eNB.

According to a first aspect of embodiments herein, the object is achieved by a method performed by a wireless device. The method is for sending a message comprising one or more populated fields to a network node. The wireless device and the network node operate in a wireless communications network. The wireless device populates one or more fields comprised in an existing message to be sent to the network node with an indication of a restriction of the wireless device. The wireless device sends the message comprising the one or more populated fields to the network node prior to an enquiry or a fetching of category and capability information of the wireless device by the network node.

According to a second aspect of embodiments herein, the object is achieved by method performed by a network node. The method is for determining the restriction of the wireless device. The network node and the wireless device operate in the wireless communications network. The network node receives the existing message from the wireless device. The message comprises the one or more fields. The one or more fields have been populated by the wireless device with the indication of the restriction of the wireless device. The receiving is performed prior to the enquiry or the fetching of the category and capability information of the wireless device by the network node. The network node determines the restriction of the wireless device, based on the indication in the received message.

According to a third aspect of embodiments herein, the object is achieved by a wireless device configured to send the message comprising the one or more populated fields to the network node. The wireless device and the network node are configured to operate in the wireless communications network. The wireless device is further configured to populate the one or more fields comprised in the existing message configured to be sent to the network node with the indication of the restriction of the wireless device. The wireless device is further configured to send the message comprising the one or more populated fields to the network node prior to the enquiry or the fetching of the category and capability information of the wireless device by the network node.

According to a fourth aspect of embodiments herein, the object is achieved by a network node configured to determine the restriction of the wireless device. The network node and the wireless device are configured to operate in the wireless communications network. The network node is further configured to receive the existing message from the wireless device. The message comprises the one or more fields. The one or more fields have been populated by the wireless device with the indication of the restriction of the wireless device. The receiving is configured to be performed prior to the enquiry or the fetching of the category and capability information of the wireless device by the network node. The network node is further configured to determine the restriction of the wireless device, based on the indication in the received message.

According to a fifth aspect of embodiments herein, the object is achieved by a computer program, comprising instructions which, when executed on at least one processor, cause the at least one processor to carry out the method according to the method performed by the wireless device.

According to a sixth aspect of embodiments herein, the object is achieved by computer-readable storage medium, having stored thereon a computer program, comprising instructions which, when executed on at least one processor, cause the at least one processor to carry out the method performed by the wireless device.

According to a seventh aspect of embodiments herein, the object is achieved by a computer program, comprising instructions which, when executed on at least one processor, cause the at least one processor to carry out the method according to the method performed by the network node.

According to an eighth aspect of embodiments herein, the object is achieved by computer-readable storage medium, having stored thereon a computer program, comprising instructions which, when executed on at least one processor, cause the at least one processor to carry out the method performed by the network node.

By the wireless device sending the message comprising the indication of the restriction of the wireless device to the network node prior to the enquiry or the fetching of category and capability information of the wireless device by the network node, the wireless device enables the network node to determine the restriction of the wireless device early enough to act accordingly, e.g., restrict an UL grant for the wireless device, and avoid a potential communication failure. Moreover, by the wireless device using the existing message to send the indication, populating the one or more fields comprised in the existing message with the indication of the restriction, the wireless device avoids impacting latency or coverage in the communications network, and unnecessarily wasting resources.

BRIEF DESCRIPTION OF THE DRAWINGS

Examples of embodiments herein are described in more detail with reference to the accompanying drawings, in which.

DETAILED DESCRIPTION

Terminologies

Figure 1:
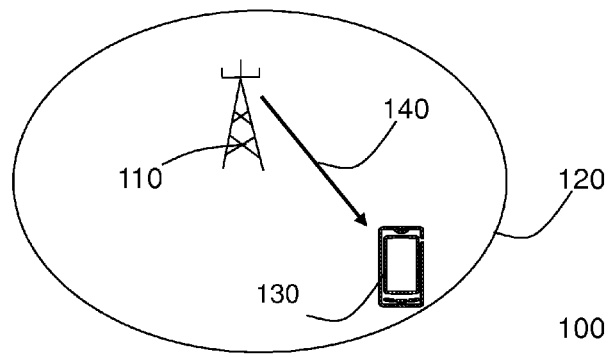
FIG. 1 is a schematic diagram illustrating embodiments in a wireless communications network, according to some embodiments.

The following commonly terminologies are used in the embodiments and are elaborated below:

Radio network node: In some embodiments, the non-limiting term radio network node is more commonly used and it refers to any type of network node serving a UE and/or connected to other network nodes or network elements, or any radio node from where a UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

Network node: In some embodiments, a more general term "network node" is used and it can correspond to any type of radio network node or any network node, which communicates with at least a radio network node. Examples of network node are any radio network node stated above, core network node (e.g., MSC, MME etc.), O&M, OSS, SON, positioning node, e.g., E-SMLC, MDT etc.

User equipment: In some embodiments, the non-limiting term user equipment (UE) is used and it refers to any type of wireless device communicating with a radio network node in a cellular or mobile communication system. Examples of UE are target device, device to device UE, machine type UE or UE capable of machine to machine communication, PDA, iPAD, Tablet, mobile terminals, smart phone, laptop embedded equipped (LEE), laptop mounted equipment (LME), USB dongles etc.

The embodiments herein also apply to the multi-point carrier aggregation systems.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel.

As part of the development of embodiments herein, one problem associated with existing approaches will first be identified and discussed.

One problem with the working assumption described in the Background section is that the eNB may give a grant larger than what the UE requests in the BSR, even if it is less than 1000 bit, until the network is aware of the TBS limitation. This may occur if resources are available to compensate the uncertainty in data arrival at the UE side due to delay, i.e. if a UE is uploading a file and the data is arriving in the UE transmission buffer asynchronously with respect to the grants it receives from the eNB. The resources mentioned here may refer to the resources available in the network node, e.g. Physical Resource Blocks (PRBs), for UEs in connected mode or requesting access. Even though the UE may request less than 1000 bits in the BSR, the serving network node may provide a larger grant, if possible, assuming that the UE may have more data waiting to be sent by the time it receives the grant. This is a problem since the UE may not override the grant from the eNB, and the grant is to transmit a certain TBS on a set of PRBs. Modifying the TBS means changing either the Modulation and Coding Scheme (MCS) or the PRB allocation. If the UE has UL data which is less than what is granted by the eNB for transmission, padding may be needed to make the overall data payload equal to the grant. In short, it is possible that a low complexity UE, which restricts its BSR to less than 1000 bit, may still be granted with a TBS of size larger than 1000 bits. This may lead to a communication failure.

A similar problem may arise due to other restrictions in the UE than the TBS. For example, these may be other restrictions a low complexity UE may have, such as a limited output power or limited receiver sensitivity. Similarly, the same problem may arise due to another category of the device not being communicated to the serving network node early enough, that is, a category of device that does not primarily have a TBS restriction but e.g., also, or instead, a particularly low link level capability. That is, that the device requires more power from the network to achieve a good connection quality and/or that the device may be restricted in maximum transmitted power levels as compared to other devices. That is, the capability of the UE associated with the restriction may not be provided to the network in time for the network to act accordingly.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

FIG. 1 depicts an example of a wireless communications network 100, sometimes also referred to as a cellular radio system, cellular network or wireless communications system, in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system. Thus, although terminology from 3GPP LTE may be used in this disclosure to exemplify embodiments herein, this should not be seen as limiting the scope of the embodiments herein to only the aforementioned system.

The wireless communications network 100 comprises a plurality of network nodes whereof a network node 110 is depicted in FIG. 1. The network node 110 may be a transmission point such as a radio base station, for example an eNB, an eNodeB, or an Home Node B, an Home eNode B or any other network node capable to serve a wireless device, such as a user equipment or a machine type communication device in a wireless communications network. For example, in a D2D context, the network node 110 may be a wireless device.

The wireless communications network 100 covers a geographical area which may be divided into cell areas, wherein each cell area is served by a network node, although, one network node may serve one or several cells. In the non-limiting example depicted in FIG. 1, the network node 110 serves a cell 120. The network node 100 may be of different classes, such as, e.g., macro eNodeB, home eNodeB or pico base station, based on transmission power and thereby also cell size. Typically, the wireless communications network 100 may comprise more cells similar to the cell 120, served by their respective network node. This is not depicted in FIG. 1 for the sake of simplicity. The network node 110 may support one or several communication technologies, and its name may depend on the technology and terminology used. In 3GPP LTE, the network node 110, which may be referred to as eNodeBs or even eNBs, may be directly connected to one or more core networks.

A wireless device 130 also referred to herein as a user equipment or UE is located in the wireless communication network 100. More wireless devices may be located in the wireless communications network 100. This is not depicted in FIG. 1 for the sake of simplicity. The wireless device 130 may e.g. be a user equipment, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any user. For example, in a D2D context, the wireless device 130 may be a first wireless device and the network node 110 may be a second wireless device.

The wireless device 130 is configured to communicate within the wireless communications network 100 with the network node 110 over a radio link 140.

In other examples than those depicted in FIG. 1, wherein the wireless communications network 400 is a non-cellular system, any of the wireless device 130 and the network node 110 may serve receiving nodes with serving beams.

In some embodiments, any of the network node 110 and the wireless device 130 may be implemented in a so-called cloud solution, referring to that the implementation may be distributed and the network node 110 may be a so-called virtual node or virtual machine.

More specifically the following are network node and wireless device related embodiments.

Figure 2:
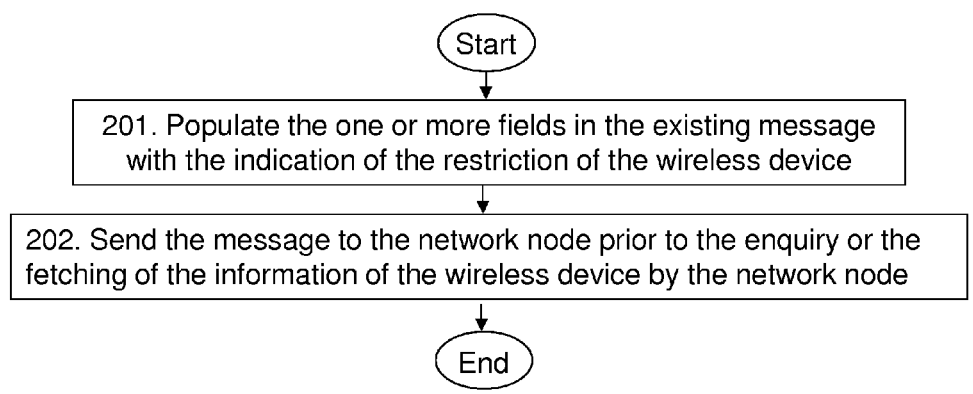
FIG. 2 is a flowchart depicting embodiments of a method in a wireless device, according to embodiments herein.

Embodiments of a method performed by the wireless device 130 for sending a message comprising one or more populated fields to the network node 110, will now be described with reference to the flowchart depicted in FIG. 2. The wireless device 130 and the network node 110 operate in the wireless communications network 100. FIG. 2 depicts a flowchart of the actions that are performed by the wireless device 130 in embodiments herein.

One or more of the embodiments herein described may be combined, where applicable.

Action 201

In order to avoid a communication failure, the wireless device 130 may need to provide the network node 110 with any category indication in due time for the network node 110 to act accordingly, e.g., by restricting a grant. It may also beneficial provide this category indication avoiding to impact latency or coverage in the wireless communication network 100. In order to satisfy these goals, in this action, the wireless device 130 populates one or more fields comprised in an existing message to be sent to the network node 110 with an indication of a restriction of the wireless device 130.

During the establishment of a communication, the wireless device 130 and the network node 110 may exchange a number of messages. For example, in the Evolved Universal Terrestrial Radio Access Network (E-UTRAN), this is known as the RRC procedure. By populating the one or more fields with the indication in an existing message, for example one of the messages of the RRC procedure, as opposed to a creating a new or additional message, the wireless device 130 may provide the indication of the restriction to the network node 110 without affecting the latency and/or coverage of the wireless communications network 100. Increased latency may be avoided by avoiding communicating an additional message, and/or coverage may be avoided by avoiding creating additional interference through an additional message.

The Restriction

The restriction may be a category restriction, such as a Transport Block Size restriction. In some embodiments, the wireless device 130 may be a low complexity wireless device, as described earlier. In some of these embodiments, the restriction may therefore be a category restriction for low complexity wireless devices. In some embodiments, the restriction may be a TBS restriction, for example, for low complexity wireless devices. As mentioned earlier, the restriction may also be another restriction such as a shortage of power duty cycles in the device, i.e., a small battery.

The Indication

Embodiments herein may relate to the indication of restriction for the wireless device 130. The indication of the restriction may be provided to the network node 110 as, for example, a category or a capability of the wireless device 130. In some embodiments, the category may be related to a TBS restriction. However, in other embodiments, the a category of the wireless device 130 may not primarily be related to a TBS restriction' but also, or instead, to e.g., a particularly low link level capability, in relation to for example a limited output power restriction or a limited receiver sensitivity restriction.

In some embodiments, the indication may simultaneously indicate a Common Control Channel, CCCH, on Uplink Shared CHannel, UL-SCH, as well as the TBS restriction. That is, in some embodiments the indication may serve two purposes, indicating the restriction as well as carrying the information that it is a subheader for a CCCH SDU. The UL-SCH is a Transport Channel. The CCCH is a Logical channel.

The Populating

Populating may also be referred to as adding the indication to the one or more fields, or filling-up the fields with the indication. To be able to send the information in an existing message, and avoid impacting the latency or coverage of the wireless communications network 100, the one or more fields may be populated with the indication, such that the size, e.g., bit size, or structure of the message remain unaltered by the added indication when populating the one or more fields.

In order to provide the network node 110 with any category indication in due time for the network node 110 to act accordingly, e.g., by restricting a grant, the populating is performed prior to an enquiry or a fetching of information, such as category and capability information, of the wireless device 130 by the network node 110, such as prior to the completion of an RRC procedure with network node 110.

The Existing Message

In order to avoid a communication failure, the wireless device 130 may need to provide the network node 110 with the indication in due time for the network node 110 to act accordingly. This means the wireless device 130 may need to provide the network node 110 with the indication prior to the enquiry or the fetching of the information, such as the category and capability information, of the wireless device 130 by the network node 110. Prior to the enquiry is understood herein to refer to prior to the wireless device 130 receiving the inquiry of category and/or capability information of the wireless device 130 from the network node 110.

In the exemplary context of the RRC procedure, this issue with existing proposals wherein the eNB may give a grant larger than what the UE requests in the BSR, may be addressed if low complexity UEs may send the indication earlier that it does in existing proposals, i.e. via one of the RRC messages Message (Msg)1, Msg3, or Msg5. Msg1, Msg3 and Msg5 are messages that may be sent from the wireless device 130 to the network node 110 during RRC, and may thus need to be granted by the network node 110. The messages Msg2 and Msg4 may be sent from the network node 110 to the wireless device 130 during RRC. In existing proposals, the category information is provided by a UE to its serving network node in e.g., the RRC UE capabilityInformation message, when using the RRC UE capability transfer procedure.

In terms of finding a good candidate to be the "existing message" in the particular context of the RRC, the size of the following RRC messages for connection establishment; Msg1, Msg2, and Msg3, is much smaller than 1000 bit and it is not likely that these messages are extended beyond 1000 bits in the future, considering the impact on the network performance due to coverage issues. This is because more bits may require to be transmitted with larger power to provide the same coverage. Today Msg 1 and Msg 2 have fixed sizes. Also, Msg4 is now and may likely in the future remain smaller than 1000 bits since upon the building of Msg4, RRCConnectionSetup, the network may not know the Access Stratum (AS) release of the UE. Therefore, Msg4 building may need to be based on a conservative assumption that the UE is of Release 8, which is the earliest Evolved Universal Terrestrial Radio Access (E-UTRA) Release. Hence, the message may always need to be built according to Rel-8 assumptions and even if new functionality is added in future releases, it may not contain much more than what a Rel-8 UE may handle. In conclusion, the problem of eNB granting more than 1000 bits may not occur until earliest with Msg5, RRCConnectionSetupComplete, which on the other hand, may carry a Non-Access Stratum (NAS) message and therefore may have a size larger than 1000 bit. Msg5 may be sent using the Radio Link Control (RLC)-Service Access Point (SAP): Acknowledged Mode (AM) and may therefore be segmented if needed, since the network node 110 may then provide smaller grants than required for the whole message to be sent at once. If the RRC message is segmented and the indication is included in the RRC message, reception of all segments may be needed before the indication may be received. Still, this may require the network 110 to know the TBS limitation in advance, preferably already at the reception of Msg3. Thus, Msg3, in the RRC context, may be the existing message.

A constraint for the embodiments herein may be that the Msg3 size is not increased. A larger size implies decreased coverage for all devices that perform initial access. There are a few spare values, alternatively a spare bit in the RRC context of Msg3. Indeed, an indication in an extended RRC context of Msg3 for initial access may address the problem. 3GPP TS 36.331 RRC may use a language called ASN that uses so called extension information. This may be used to extend a message to contain further information elements, e.g. in a later release, in a backward compatible way. But it may difficult to extend that context since, contrary to subsequent messages, it may be sent using a strict size limitation over the CCCH and RLC-SAP: Transparent Mode (TM), i.e. it may be exchanged without the data layer options to segment and retransmit that is provided by RLC AM. Thus, any mechanism for non-critical extensions, which is the most typical way of extending RRC messages, may not be used.

The problem may also occur for other access requests on CCCH, e.g. when the UE, that is, the wireless device 130, may make an attempt to re-establish its RRC connection in a cell which has not been previously prepared. The cell may not recognize the Cell Radio Network Temporary Identifier (C-RNTI) of the UE and may need to handle the access in the similar way without prior knowledge about the UE capabilities, thus without prior knowledge of category restrictions.

According to embodiments herein, the indication may be provided by the wireless device 130 using the MAC overhead of Msg3 for CCCH Access. A low complexity UE may use this MAC overhead to indicate any category restriction to the network node 110. If the indication is in the MAC header and included in e.g., all segments of a message, the indication may be obtained faster because then it may be enough to receive only one segment already before the reassembly of the entire RRC message. A header may refer herein to the one or more subheaders a message may have. When there is only one subheader in the header, header and subheader may be used interchangeably herein.

A detailed description and particular examples of the existing message and the one or more fields will be provided later, in reference to FIGS. 3-9.

It may be understood by one of skill in the art, that a similar strategy to that provided herein to identify a good candidate for the existing message in the RRC context, in order to provide the indication to the network node 110 in a time to avoid a communication failure, may be applied to other contexts in RANs other than E-UTRAN.

The One or More Fields

In accordance with the foregoing description of the existing message, and within the context of the RRC, in some embodiments, the one or more fields may be comprised in a header or subheader of a Medium Access Control, MAC, message, such as an existing MAC message. In particular embodiments, the one or more fields may be comprised in a header of an Msg3 message for CCCH Access. A field is understood here to refer to a set of time-frequency resources.

The one or more fields may be populated with the indication, such that the size, or structure of the message remain unaltered by the added indication when populating the one or more fields. This is to avoid alterations in the latency and coverage once the message is sent to the network node 110. Accordingly, in some embodiments, the one or more fields may be a reserved bit in the existing message. In some embodiments, the one or more fields may be a Logical Channel ID (LCID) field in the existing message. Further detailed description on the one or more fields, and how the indication may be provided in them is presented below, in relation to FIGS. 3-9.

Action 202

In order to provide the network node 110 with any category indication in due time for the network node 110 to act accordingly, e.g., by restricting a grant, in this action, the wireless device 130 sends the message comprising the one or more populated fields to the network node 110 prior to the enquiry or the fetching of the information, such as the category and capability information of the wireless device 130 by the network node 110.

According to embodiments herein, the indication may be sent by the wireless device 130 using the MAC overhead of Msg3 for CCCH Access. A low complexity UE may use this MAC overhead to indicate any category restriction to the network node 110.

Examples of the Existing Message and the One or More Fields

According to the foregoing, embodiments herein may use fields in the MAC header in the Msg3 for CCCH Access to signal category restrictions, such as TBS restriction for low complexity UEs, before UE category and capability information may be exchanged.

The shortest subheader is advisable, as it may yield the smallest message, that is, fewer bits. Lower power may be needed for fewer bits, or if same power is used, the coverage of a smaller size message may be better, larger. It may be desirable to consider the coverage of Msg3 since it is a part of the setup procedure, as it occurs at a point in time where all power and link adaptation control may not be in place yet. However, embodiments herein apply to MAC subheaders of any available size.

Figure 3:
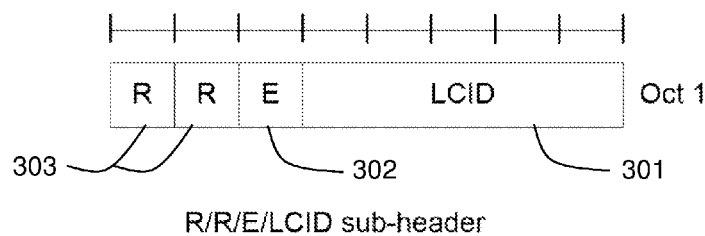
FIG. 3 is a schematic diagram illustrating an R/R/E/LCID MAC Subheader, according to existing methods.

The shortest available MAC subheader is the R/R/E/LCID subheader, which is used for the last subheader in a MAC Protocol Data Unit (PDU) and for fixed sized MAC Control Elements. A MAC Control Element, according to 3GPP TS 36.321, may be understood as the 'payload'. The 'payload' for a BSR may be understood as a report on buffer sizes per up to 4 logical channel groups. FIG. 3 is a schematic diagram illustrating an R/R/E/LCID MAC Subheader, which is the shortest available MAC subheader.

The subheader for the CCCH Service Data Unit (SDU) in Msg3, which is a particular example of what is referred to herein as the existing message, currently may consist of the following fields:

Logical Channel IDentity (LCID): The Logical Channel ID field 301 may identify the logical channel CCCH with LCID=00000. This may allow a MAC receiver to determine the message is sent on the CCCH.

E: The Extension field 302 may be set to "0", thus indicating the absence of more fields in the MAC header. The MAC SDU corresponding to CCCH may start at the next byte.

R: Is a Reserved bit 303, it may be set to "0". In existing methods, this reserved bit is not used. As shown in the Figure, there may be two reserved bits 303.

At the top of the drawing, the horizontal line represents one octet in the sub-header, wherein the vertical lines represent bits. That is, both Reserved bits 303 take one bit each, the E field 302 takes one bit, and the rest is for the LCID field 301, i.e. 5 bits.

Figure 4:
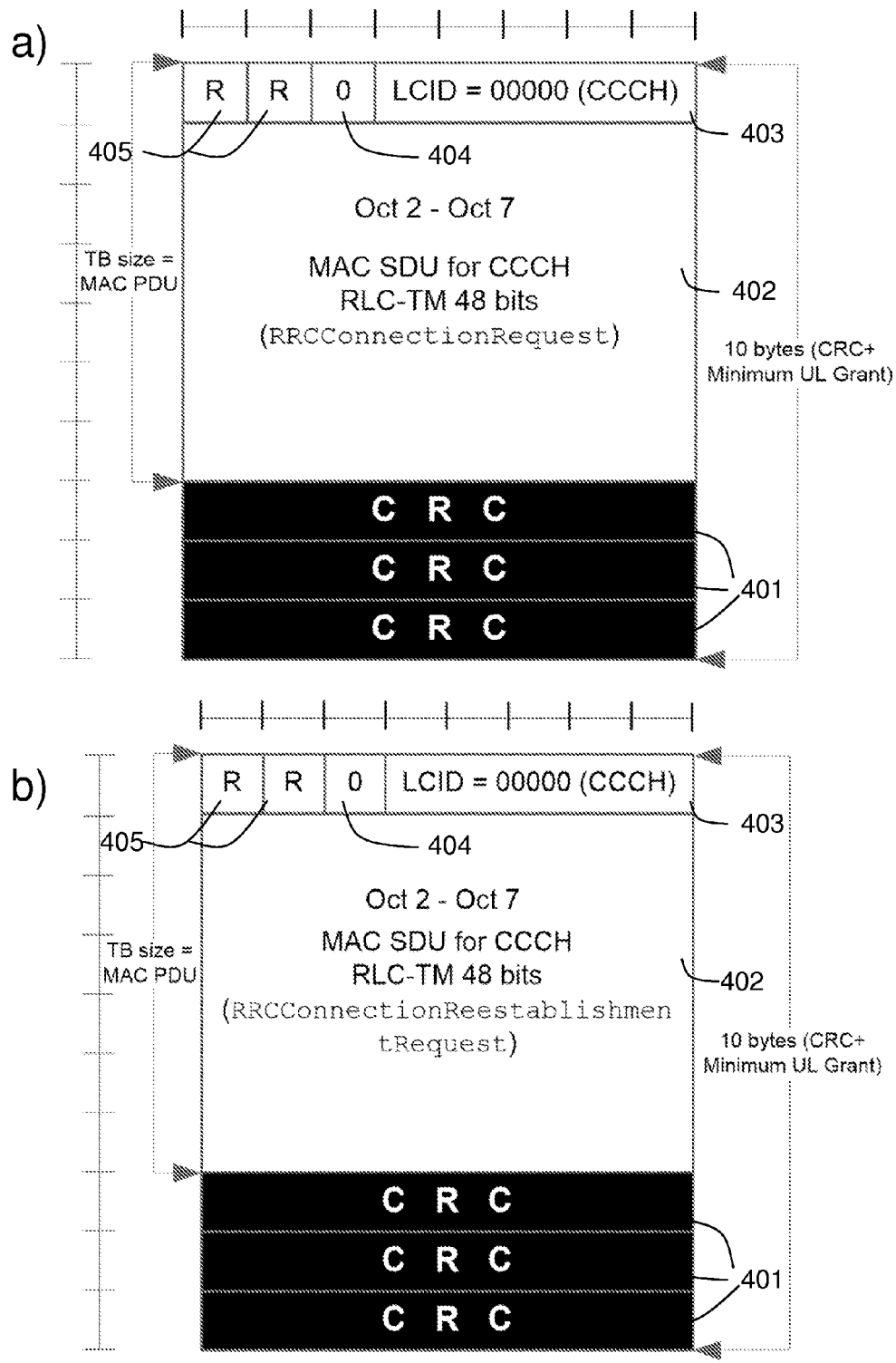
FIG. 4 is a schematic diagram illustrating two examples of Msg3 for CCCH Access, according to existing methods.

The smallest possible Msg3 in existing methods is illustrated in a schematic diagram in FIG. 4, and is the result of the smallest grant that may be provided by an eNB. The 3GPP TS 36.321 Medium Access Control (MAC) protocol specification v 12.2.1, see http://www.3gpp.org/ftp/Specs/archive/36 series/36.321/36321-c21.zip, states that:

"NOTE: When an uplink transmission is required, e.g., for contention resolution, the eNB should not provide a grant smaller than 56 bits in the Random Access Response."

FIG. 4 is illustrating two non-limiting examples (a and b) of Msg3 for CCCH Access, without an L-field, as described later, and padding. Example a) is an RRC Connection Request, and example b) is an RRC Connection Reestablishment Request. In each of the examples a) and b), three Cyclic Redundancy Check bytes (CRC) 401 are appended to the message. Msg3 may refer herein to the whole message on a MAC level, that is, to the CCCH subheader, the CCCH SDU and possibly other elements, e.g. padding, or BSR, Power Headroom Report (PHR), etc. . . . , but not the CRC, e.g. the CRC bytes 401. The CRC may be considered a physical layer appendix to the granting that fits a MAC message. This applies to all the Figures herein wherein the CRC is shown as being appended. The smallest possible Msg3 for CCCH access may consist only of CCCH subheader and CCCH SDU 402. If the network grant is larger, the UE may fill it with BSR, PHR, padding according to a predetermined prioritization order.

The TB size of the MAC PDU is also indicated with arrows. The TB size together with the 3 CRC bytes 401 is 10 bytes. The size of the MAC SDU 402 for CCCH RLC-TM in each of examples a) and b) is 48 bits. The location of the MAC SDU 402 is indicated as being from Octet (Oct) 2 to Oct 7. In each of the examples a) and b), the subheader comprises the LCID field 403 set to 00000, identifying the CCCH, the E field 404 set to 0, and two reserved bits 405.

At the top of the drawing, the horizontal line with the vertical cross lines represents consecutive bits. The vertical line on the left side of the drawing with the horizontal cross lines represents 10 consecutive bytes.

Figure 5:
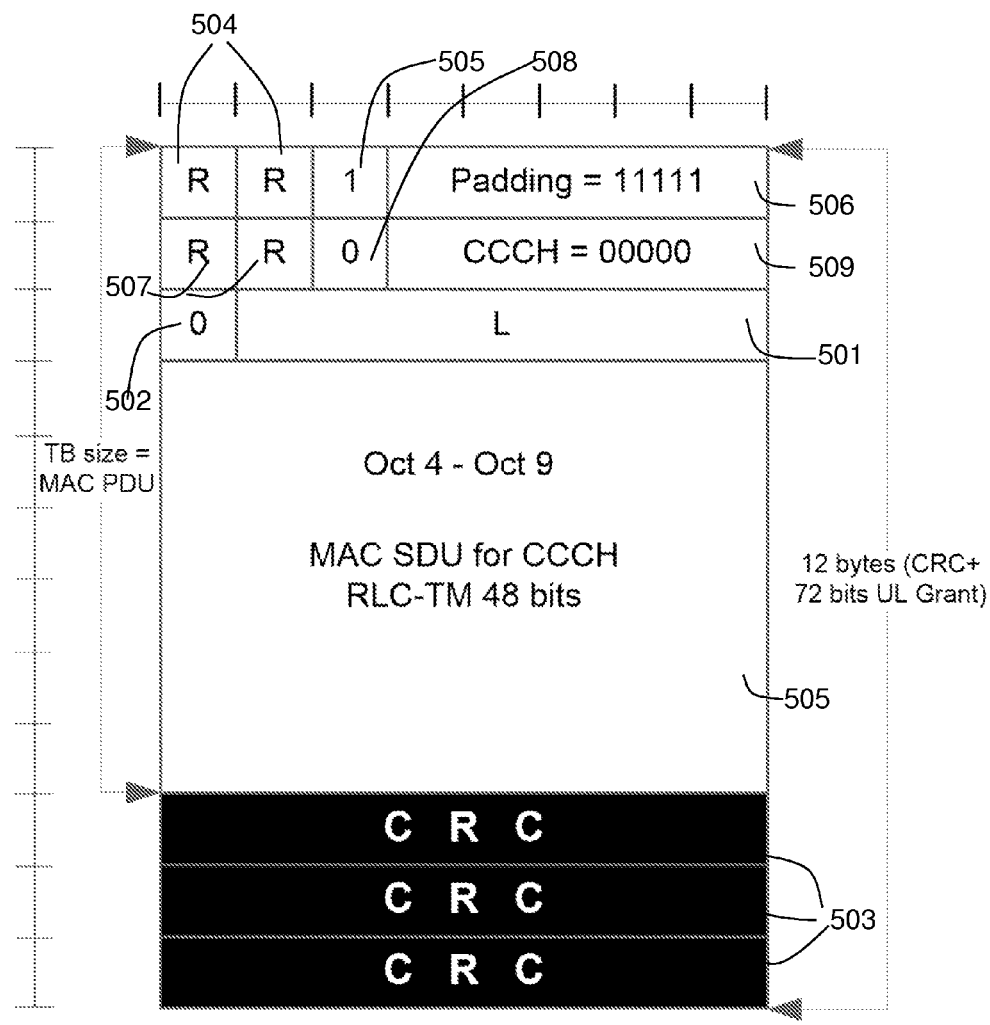
FIG. 5 is a schematic diagram illustrating an example of an Msg3 for CCCH Access, according to existing methods.

Occasionally, it may come with a benefit to provide a somewhat larger grant in the Random Access Response. The wireless device 130, e.g. a UE, may in that case use padding to fill up the grant. It may also need to use an L-field, as defined below, in the subheader for the CCCH payload. There may be a few possible variants given the grant size and the standardized logical channel prioritization rules, FIG. 5 illustrates one. FIG. 5 is a schematic diagram illustrating a non-limiting example of an Msg3 for CCCH Access, with an L-field 501 and a Format field (F) 502. The F=0, and the L-field 501 is 7 bits. Three CRC bytes 503 are appended to the message. The Format field 502 indicates the size of the Length field 501. There may be one F field 502 per MAC PDU subheader except for the last subheader and subheaders corresponding to fixed-sized MAC control elements, which may not have one. The size of the F field 502 may be 1 bit. If the size of the MAC SDU or variable-sized MAC control element is less than 128 bytes, the value of the F field 502 may be set to 0, as in this example, otherwise it may be set to 1.

Generally, a MAC PDU subheader may consist of six header fields R/R/E/LCID/F/L, but for the last subheader in the MAC PDU and for fixed sized MAC control elements. The last subheader in the MAC PDU and subheaders for fixed sized MAC control elements may consist solely of the four header fields R/R/E/LCID. A MAC PDU subheader corresponding to padding consists of the four header fields R/R/E/LCID. In this example, the subheader corresponding to padding consists of two Reserved bits 504, an E field 505 set to "1" indicating that there are more fields in the header, and a LCID field 506 set to "11111" indicating padding. In this example, the size of the UL grant is 72 bits. Also in this example, the MAC PDU subheader corresponding to the CCCH SDU consists of two Reserved bits 507, an E field 508 set to "0" indicating the absence of more fields in the MAC header, an LCID field 509 set to 00000 identifying the CCCH, the F field 502, which is set to 0, and the L field 501.

The TB size of the MAC PDU is also indicated with arrows. The TB size together with the 3 CRC is 12 bytes. The size of the MAC SDU 505 for CCCH RLC-TM is 48 bits. The location of the MAC SDU 505 is indicated as being from Oct 4 to Oct 9.

At the top of the drawing, the horizontal line with the vertical cross lines represents consecutive bits. The vertical line on the left side of the drawing with the horizontal cross lines represents 12 consecutive bytes.

Figure 6:
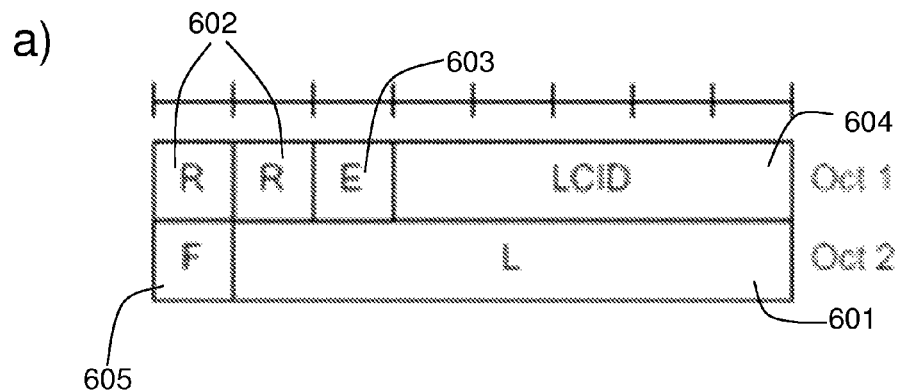
FIG. 6 is a schematic diagram illustrating two examples of L-field formats according to existing methods.
Figure 6:
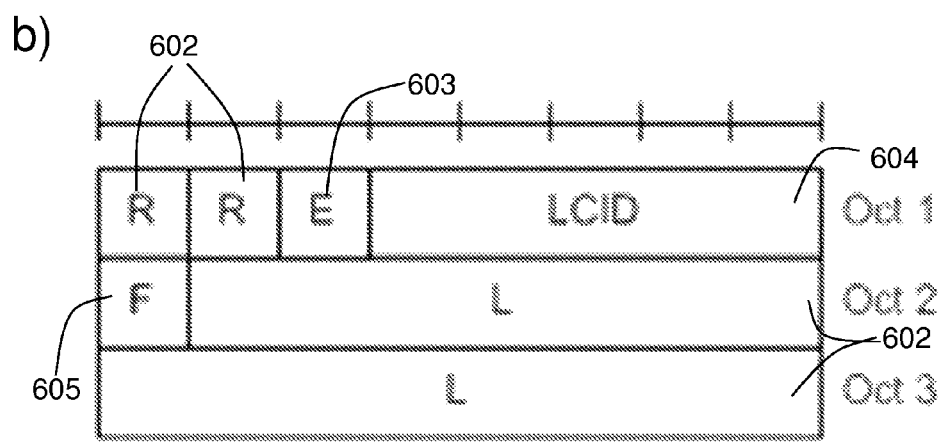

FIG. 6 is a schematic diagram illustrating two non-limiting examples, a) and b), of L-field formats which may be used in embodiments herein. Example a) depicts a 7 bit L field 601, and example b) depicts a 15 bit L field 602. The network node 110 may not provide a grant smaller than 56 bits in the Random Access Response, but it may provide a larger grant. If the network node 110 does so, the format rules of 36.321 may occasionally require an L-field subheader in order to signal the length of the CCCH subheader. Also shown in the examples a) and b) are of two Reserved bits 602, an E field 603, an LCID field 604 and an F field 605. The bytes corresponding to the fields are indicated as Oct in the Figure.

Embodiment 1: Introducing a T Type Field in the Subheader of CCCH SDU in Msg3

Figure 7:
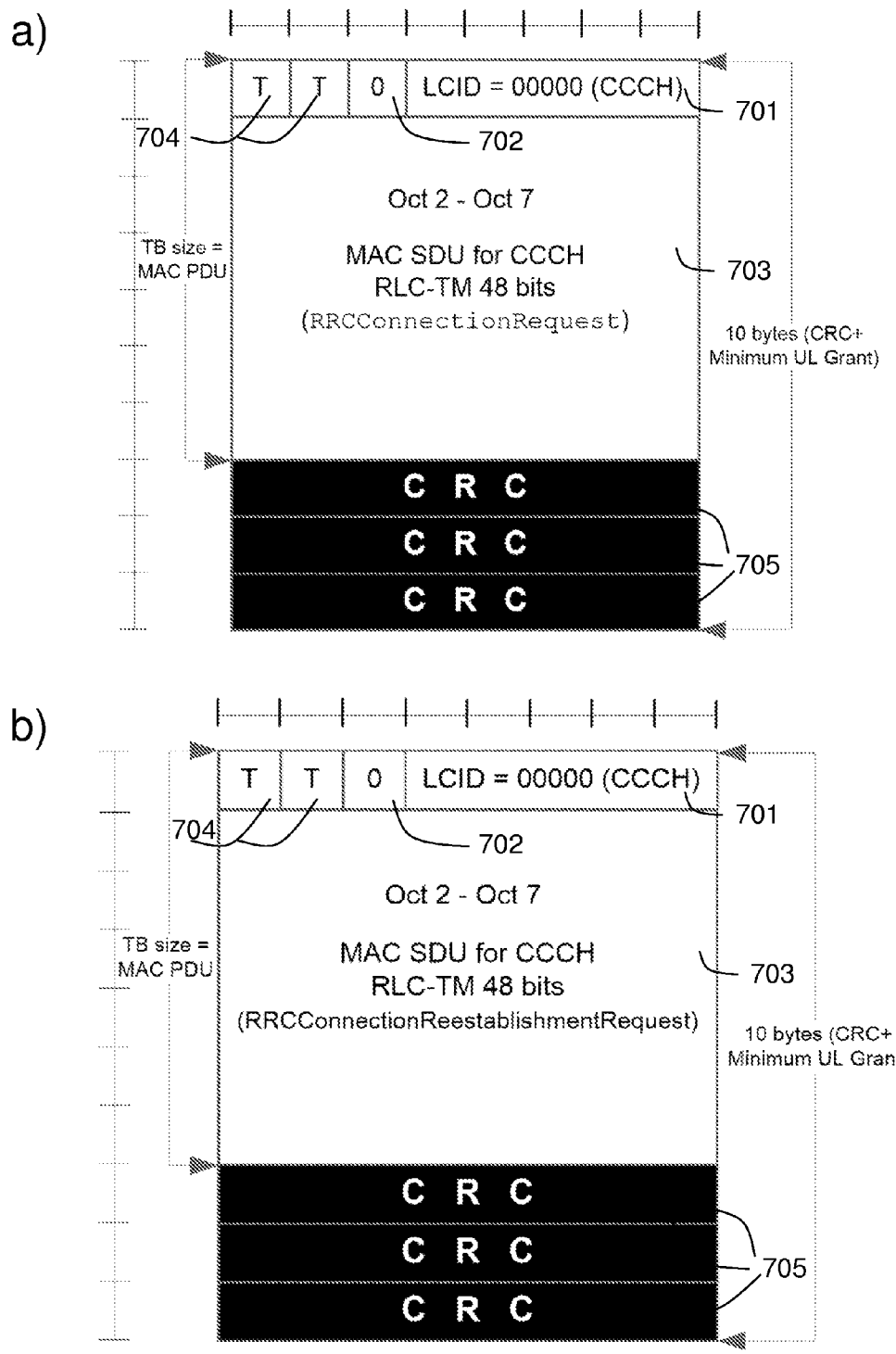
FIG. 7 is a schematic diagram illustrating the case for the smallest possible Msg3 grant, according to embodiments herein.

In a first embodiment, one or both of the reserved bits R in the MAC PDU subheader of the CCCH SDU in Msg3 may be used to send the indication of TBS restriction. In this embodiment, the LCID=00000 for UL-SCH, which is explicitly indicating CCCH on UL-SCH, may be used. FIG. 7 is a schematic diagram illustrating the case for the smallest possible Msg3 grant, with two examples, a) and b), of the first embodiment. Example a) is an RRC Connection Request, an example b) is an RRC Connection Reestablishment Request.

The MAC subheader of the CCCH SDU in Msg3 corresponding to the first embodiment may consist of the following fields:

LCID: The Logical Channel ID field 701 may identify the logical channel CCCH with LCID=00000.

E: The Extension field 702 may be set to "0", thus indicating the absence of more fields in the MAC header. The MAC SDU 703 corresponding to CCCH may start at the next byte.

T: <both R bits used> The Type field 704 may be used to indicate that the wireless device 130, e.g., a UE, supports only a maximum of downlink and uplink TBS of 1000 bits, e.g., it may be set to, that it, the wireless device 130 may populate it with, "01", "10" or "11", while "00" implies no restriction. To indicate may be understood herein as providing the indication. In other words, the indication according to the third embodiment may be "01", "10", "11", or "00" in the T field, wherein "00" implies no restriction. This particular embodiment, wherein both R bits are used is represented in both examples of FIG. 7, although in other embodiments, only one of the R bits may be used, as explained below; <or>

T: <one R bit used> The Type field may be used to indicate that the wireless device 130, e.g., a UE, supports only a maximum of downlink and uplink TBS of 1000 bits, for example, it may be set to "1" while "0" implies no restriction. In other words, the indication according to the third embodiment may be "1" or "0" in the T field, wherein "0" implies no restriction.

optionally F: The Format field, which is not represented in the example of FIG. 7, may indicate the size of the Length field. There may be one F field per MAC PDU subheader, except for the last subheader and subheaders corresponding to fixed-sized MAC control elements, which do not have one. The size of the F field may be 1 bit. If the size of the MAC SDU or variable-sized MAC control element is less than 128 bytes, the value of the F field may be set to 0, otherwise it may be set to 1;

optionally L: The Length field, which is not represented in the example of FIG. 7, may indicate the length of the corresponding MAC SDU or variable-sized MAC control element in bytes. There may be one L field per MAC PDU subheader, except for the last subheader and subheaders corresponding to fixed-sized MAC control elements, which do not have one. The size of the L field may be indicated by the F field.

In some embodiments, the Type field 704 may be referred to as a "Thousand-bit field" or a "TBS restriction field".

The examples of FIG. 7 also show 3 appended CRC bytes 705 to the message. Some of the other elements in the Figure have already been described in relation to FIG. 4.

In sum, according to the first embodiment, the one or more fields may be a reserved bit 704. One benefit of this approach is that it may use one LCID value, which is the same LCID value, for all CCCH accesses.

Embodiment 2: Using a LCID Value Indicating BSR in the Msg3 for CCCH Access

Figure 8:
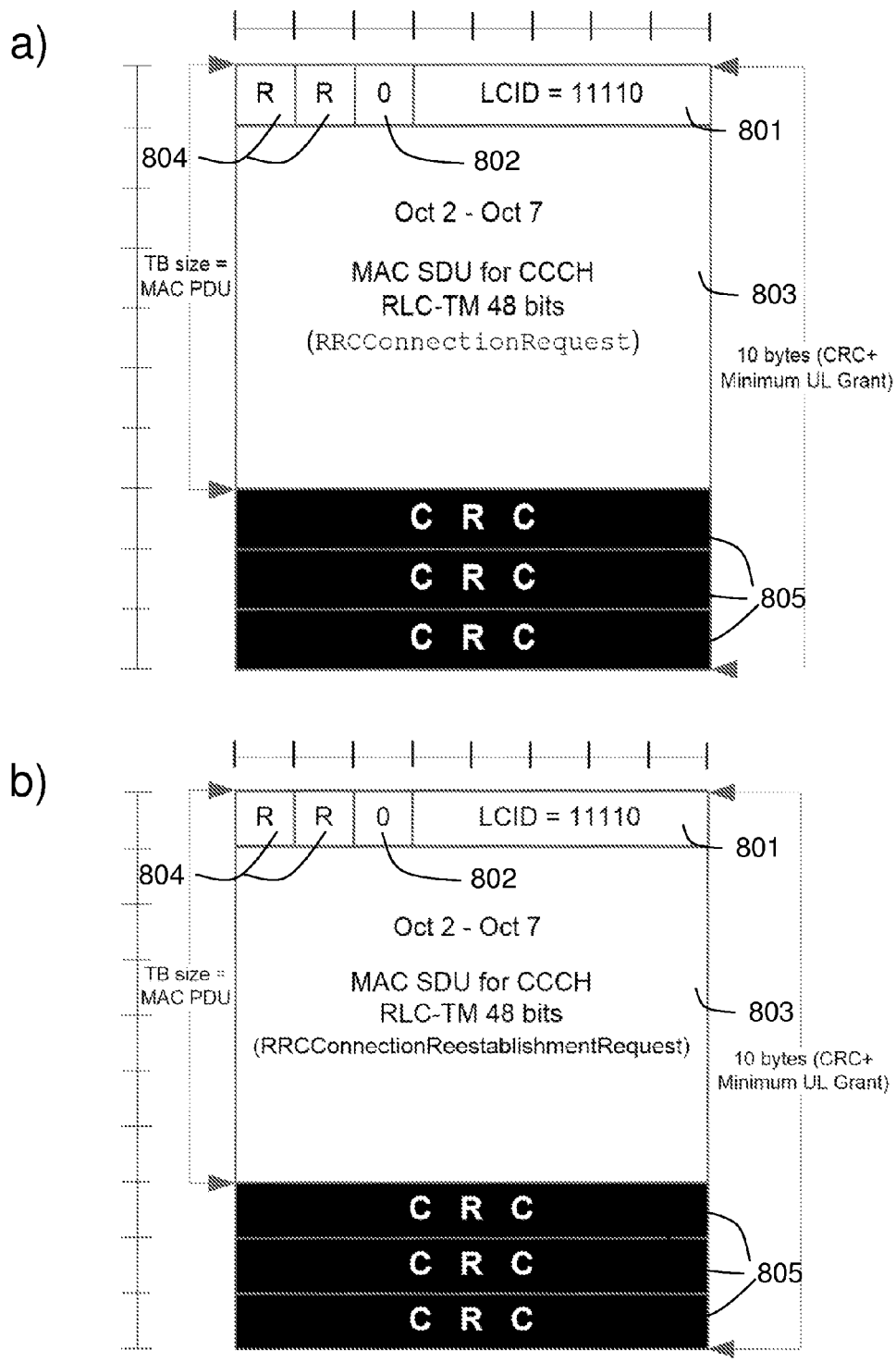
FIG. 8 is a schematic diagram illustrating the case for the smallest possible Msg3 grant according to embodiments herein.

In a second embodiment, the normal LCID field which may be currently used to indicate a CCCH content in the Msg3 for CCCH Access, may not be used. Instead, in this embodiment, either one of BSR LCID for UL-SCH may be used, i.e. either LCID=11100, 11101 or 11110, thus also indicating either Truncated BSR, Short BSR or Long BSR. In the particular case of Embodiment 2, Msg3 may be sent as part of the RRC connection establishment, i.e., at a time when neither buffers nor logical channel groups may have been defined. Therefore, the normal implication of BSR may not be valid and it may instead be used by a low complexity UE to simultaneously indicate CCCH on UL-SCH, as well as TBS restriction. There may be no need for a MAC control element, neither may an actual buffer status report be valid. Also, further bytes from a MAC control element may not be desired, since that may increase the message size. Thus, in some embodiments, there may be no MAC control element corresponding to this subheader, when used in Msg3. FIG. 8 is a schematic diagram illustrating the case for the smallest possible Msg3 grant according to Embodiment 2 through two non-limiting examples, a) and b), although embodiments herein apply to Msg3 messages of any available size. Example a) is an RRC Connection Request, an example b) is an RRC Connection Reestablishment Request.

As may be appreciated in the examples of FIG. 8, the MAC header of Msg3 for CCCH Access corresponding to the second embodiment may consist of the following fields:

LCID: The Logical Channel ID field 801 with LCID may be set to, that is populated with, either "11100", "11101" or "11110" and used to indicate that the wireless device 130, e.g., the UE, may support a maximum of downlink and uplink TBS of 1000 bits. When used in an Msg3 for CCCH Access, it may simultaneously identify the logical channel CCCH. The occurrence of the particular BSR LCID in Msg3 may not correspond to a MAC Control Element, but rather only to a MAC SDU for CCCH.

"Indicate" is understood herein as providing the indication. In other words, the indication according to the second embodiment may be an LCID of either "11100", "11101" or "11110".

E: The Extension field 802 may be set to "0", thus indicating the absence of more fields in the MAC header. The MAC SDU 803 corresponding to CCCH may starts at the next byte.

R: Reserved bit 804, may be set to "0". As shown in the Figure, there may be two reserved bits 804.

optionally, a subheader for padding, which is not represented in the examples of FIG. 8.

The examples of FIG. 8 also show 3 appended CRC bytes 805 to the message. Some of the other elements in the Figure have already been described in relation to FIG. 4.

In sum, according to the second embodiment, the LCID may be set to either "11100", "11101" or "11110". One benefit of this approach is that it may reuse a LCID value that is already used and allocated, but not yet used in Msg3.

Embodiment 3: A New LCID

Figure 9:
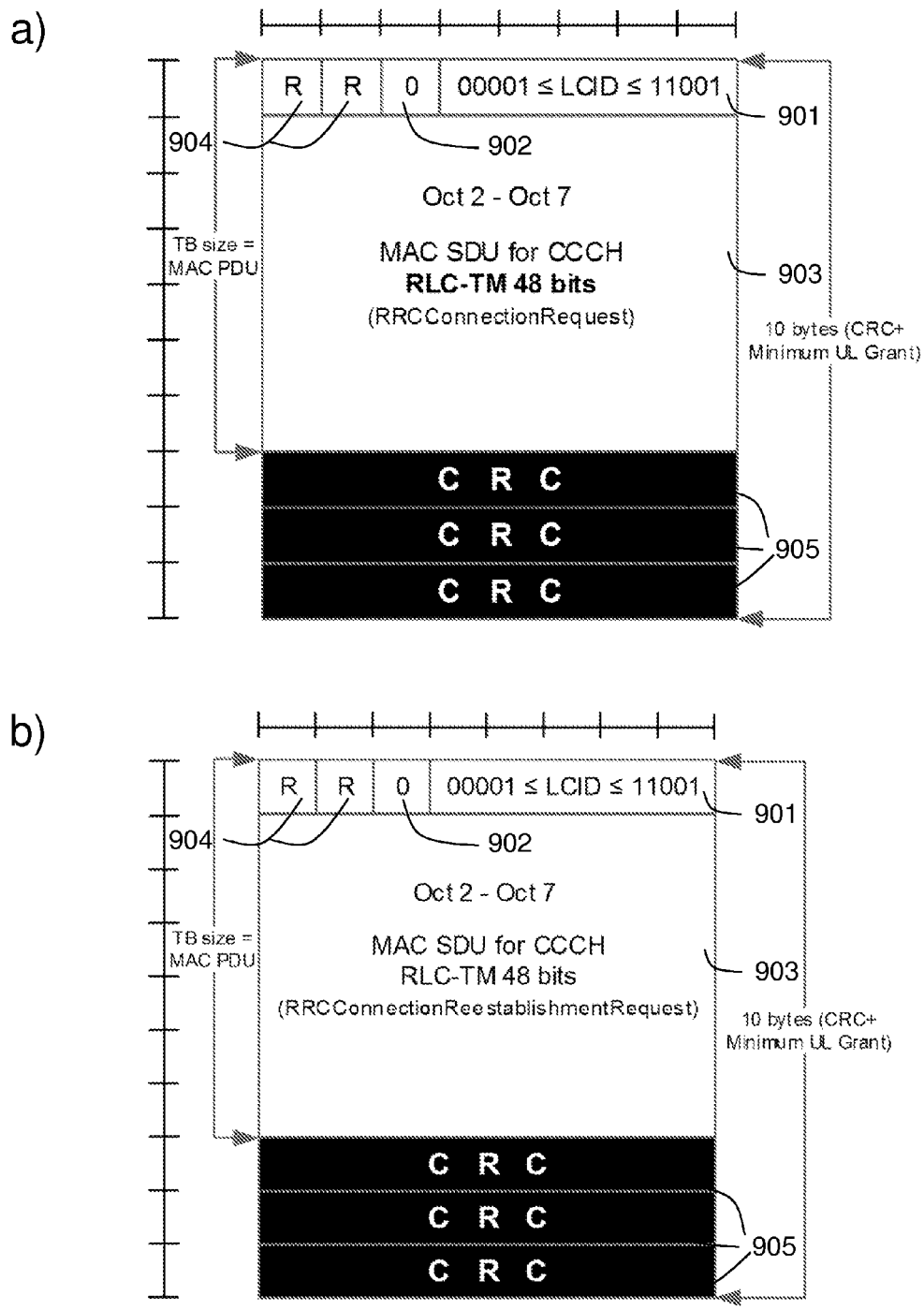
FIG. 9 is a schematic diagram illustrating the case for the smallest possible Msg3 grant according to embodiments herein.

In a third embodiment, a new LCID for UL-SCH may be allocated, with respect to existing LCIDs. The new LCID may be used by low complexity UEs to simultaneously indicate CCCH on UL-SCH as well as a TBS restriction. FIG. 9 is a schematic diagram illustrating the case for the smallest possible Msg3 grant according to Embodiment 3, using an LCID value in the range of Msg3 for CCCH Access. The smallest possible Msg3 grant is 7 bytes. FIG. 9 illustrates two non-limiting examples, a) and b), although embodiments herein apply to Msg3 messages of any available size. Example a) is an RRC Connection Request, an example b) is an RRC Connection Reestablishment Request. As may be appreciated in the examples of FIG. 9, the MAC header of Msg3 for CCCH Access corresponding to the third embodiment may consist of the following fields:

LCID: The Logical Channel ID field 901 with some LCID in the range 00001-11001 may be used to indicate that the wireless device 130, e.g., the UE, may support a maximum of downlink and uplink TBS of 1000 bits. When used in an Msg3 for CCCH Access it may simultaneously identify the logical channel CCCH. The occurrence of that particular LCID value in Msg3 may not correspond to a MAC Control Element but rather only to a MAC SDU for CCCH.

"Indicate" is understood herein as providing the indication. In other words, the indication according to the third embodiment may be some LCID in the range 00001-11001.

E: The Extension field 902 may be set to "0" thus indicating the absence of more fields in the MAC header. The MAC SDU 903 corresponding to CCCH may start at the next byte.

R: Reserved bit 904, may be set to "0". As shown in the Figure, there may be two reserved bits 904.

optionally, a subheader for padding, which is not represented in the examples of FIG. 9.

The examples of FIG. 9 also show 3 appended CRC bytes 905 to the message. Some of the other elements in the Figure have already been described in relation to FIG. 4.

In sum, according to the third embodiment, some LCID may be in the range 00001-11001. One benefit of this approach is that it may use a clear uncompromised value that is not used for other purposes. That may be particularly advantageous for low complexity devices, thereby instead leaving all complexity to the network.

Figure 10:
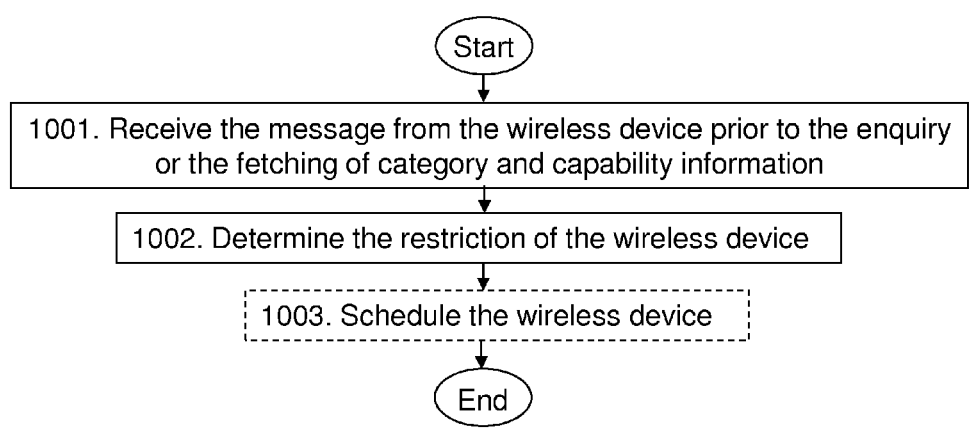
FIG. 10 is a flowchart depicting embodiments of a method in a network node, according to embodiments herein.

Embodiments of a method performed by the network node 110 for determining the restriction of the wireless device 130, will now be described with reference to the flowchart depicted depicted in FIG. 10. As mentioned earlier, the network node 110 and the wireless device 130 operate in the wireless communications network 100. FIG. 10 depicts a flowchart of the actions that are or may be performed by the network node 110 in some embodiments herein. A dashed line depicts an optional action.

One or more embodiments may be combined, where applicable. In some embodiments, all actions may be performed. In other embodiments, only some actions may be performed. The detailed description of some of the following corresponds to the same references provided above, in relation to the actions described for the wireless device 130, and will thus not be repeated here.

Action 1001

In this action, the network node 110 receives a message from a wireless device, such as the wireless device 130, that is, the existing message from the wireless device 130 sent in Action 202. The message comprises the one or more fields 704, 801, 901. The one or more fields 704, 801, 901 have been populated by the wireless device 130 with the indication of the restriction of the wireless device 130, as described above. The receiving is performed prior to the enquiry or the fetching of category and capability information of the wireless device 130 by the network node 110. Hence, the one or more fields 704, 801, 901 have been populated by the wireless device 130 prior to the enquiry or the fetching of information, such as category and capability information, of the wireless device 130 by the network node 110, such as prior to the completion an RRC procedure with wireless device 130.

It may be understood from this that in some embodiments, once the network node 110 receives the indication from the wireless device 130, it may no longer send an inquiry, that is, enquire, or fetch the category and capability information of the wireless device 130, as the indication may already provide the category and/or capability information.

As mentioned earlier, in some embodiments the wireless device 130 is a low complexity wireless device. The restriction may be a category restriction, such as a Transport Block Size restriction, for example, for low complexity wireless devices. In some particular embodiments, the restriction may be a TBS restriction, wherein the indication may simultaneously indicate a Common Control Channel, CCCH, on Uplink Shared CHannel, UL-SCH, as well as the TBS restriction.

The one or more fields 704, 801, 901 may be comprised in the header or subheader of a Medium Access Control, MAC, message, such as the existing MAC message. The one or more fields 704, 801, 901 may be populated with the indication, such that the size, e.g., bit size, or structure of the message remain unaltered by the added indication when populating the one or more fields 704, 801, 901.

In some embodiments, the one or more fields 704, 801, 901 are comprised in a header of an Msg3 message for Common Control Channel, CCCH, Access. In some embodiments, the one or more fields may be a Logical Channel ID, LCID, field 801, 901. In some of these embodiments, some LCID may be in the range 00001-11001. In some other of these embodiments, the LCID may be set to either "11100", "11101" or "11110". In other embodiments, the one or more fields may be a reserved bit 704.

Action 1002

Once the network node 110 has received the indication from the wireless device 130, in this action, the network node 100 determines the restriction of the wireless device 130, based on the indication in the received message, e.g., according to a configuration in the network node 110. For example, when the configuration is according to embodiment 3, as described above, and if e.g., the indication received from the wireless device 130 is some LCID in the range 00001-11001, the network node 110 may determine that the wireless device 130 supports a maximum of downlink and uplink TBS of 1000 bits.

According to the same embodiment 3, if the indication received from the wireless device 130 is some LCID outside the range 00001-11001, the network node 110 may determine that the wireless device 130 has no restriction for a maximum of downlink and uplink TBS of 1000 bits.

Action 1003

In order to avoid a communication failure, the network node 110 may then in this action, scheduling 903 the wireless device 130 based on the determined restriction. That is, for example, if the network node 110 in Action 1002 determines that the wireless device 130 supports a maximum of downlink and uplink TBS of 1000 bits, it may restrict the UL grants for the wireless device 130 to a TBS of 1000 bits. If, for example, the network node 110 in Action 1002 determines that the wireless device 130 has no restriction for a maximum of downlink and uplink TBS of 1000 bits, it may not restrict the UL grants for the wireless device 130 to a TBS of 1000 bits.

In summary, according to embodiments herein, a low complexity UE may indicate any category restriction already at the transmission of Msg3. In particular, embodiments herein provide a way to approach the present 3GPP R12 problem to indicate support of downlink and uplink maximum TBS of 1000 bits in due time for the network to restrict its Msg4 size and Msg5 granting. Since the embodiments herein require no additional messages and since the size of Msg3 for CCCH Access does not need to be larger than what is otherwise provided, the embodiments herein impact neither latency nor coverage.

Figure 11:
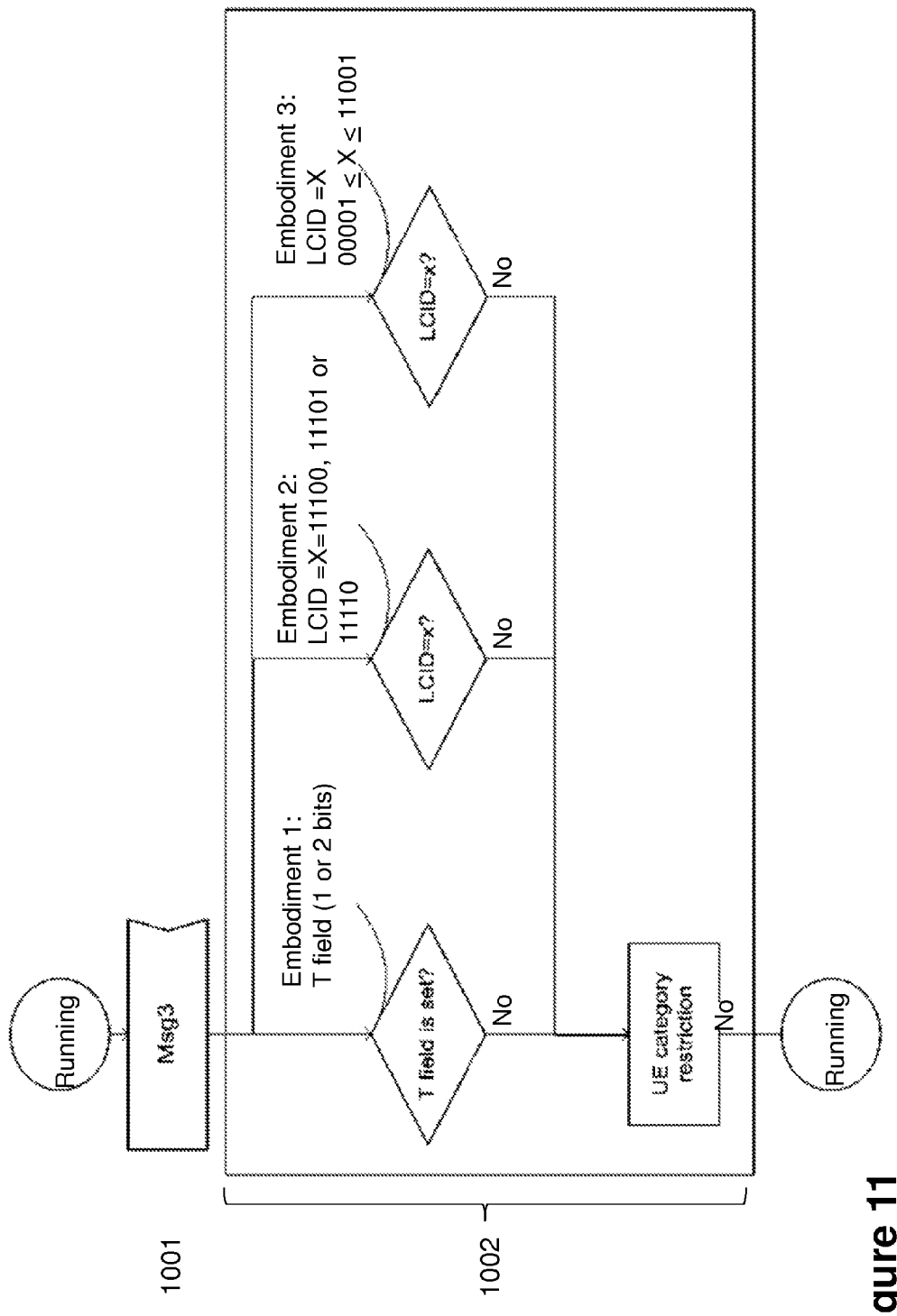
FIG. 11 is a flowchart depicting embodiments of a method in a network node, according to embodiments herein.

FIG. 11 is a schematic flowchart illustrating an example of a method in the network node 110 according to embodiments herein. In this particular example, the wireless device 130 is a UE, and the existing message is an Msg3. According to Action 1001, the network node 110 receives an Msg3 message according to any of the three embodiments described above. The three embodiments are simultaneously represented in the Figure for illustration purposes only, but it is understood that the method may be performed with one of the embodiments only. The example depicted is non-limiting. According to Action 1002, the network node 110 then determines the UE category restriction, of the wireless device 130, based on the received restriction indication in the message. According to Embodiment 1, the network node 110 may determine if the T field 704 is set, i.e., populated with a value indicating restriction or no restriction. If the T field 704 is not populated with one of the values indicating restriction, as depicted, the network node 110 may then determine that the wireless device 130 does not have a category restriction. It will be understood that, although not depicted, the opposite may also apply. That is, if the T field 704 is populated with one of the values indicating restriction, the network node 110 may then determine that the wireless device 130 has a category restriction. According to any of Embodiment 2 and Embodiment 3, the network node 110 may determine the value of the LCID field. According to Embodiment 2, the network node 110 may determine if the value of the LCID field 801 is 11100, 11101, or 11110. In the particular example represented in the Figure, the network node 110 finds no indication of a restriction. It will be understood that, although not depicted, the opposite may also apply. That is, if the LCID field 801 is populated with one of the values indicating restriction, the network node 110 may then determine that the wireless device 130 has a category restriction. According to Embodiment 3, if the network node 110 finds the indication in the LCID field 901 to be outside of the range 00001-11001, the network node 110 may determine that the wireless device 130 does not have a category restriction. It will be understood that, although not depicted, if the network node 110 finds the indication to be in the range 00001-11001, the network node 110 may determine that the wireless device 130 has a category restriction. The network node 110 may then act accordingly, e.g., by performing Action 1003, which is not depicted in this Figure.

To perform the method actions described above in relation to FIGS. 2-9, the wireless device 130 is configured to send the message comprising the one or more populated fields 704, 801, 901 to a network node 110. The wireless device 130 may comprise the following arrangement depicted in FIG. 12. As already mentioned, the wireless device 130 and the network node 110 are configured to operate in the wireless communications network 100.

The detailed description of some of the following corresponds to the same references provided above, in relation to the actions described for the wireless device 130, and will thus not be repeated here. For example, the wireless device 130 may be a low complexity wireless device.

The wireless device 130 is further configured to populate the one or more fields 704, 801, 901 comprised in the existing message configured to be sent to the network node 110 with the indication of the restriction of the wireless device 130. The wireless device 130 is configured to perform this action, e.g. by means of a populating module 1201 within the wireless device 130. The populating module 1201 may be a processor 1204 of the wireless device 130, or an application running on such processor In some embodiments, the restriction is the category restriction for low complexity wireless devices.

In some embodiments, the restriction is the TBS restriction, and the indication may be configured to simultaneously indicate a CCCH on UL-SCH, as well as the TBS restriction.

In some embodiments, the one or more fields 704, 801, 901 may be comprised in the header or subheader of a MAC message, and the one or more fields may be configured to be populated with the indication, such that the size, or structure of the message remain unaltered by the added indication when populating the one or more fields 704, 801, 901.

The one or more fields 704, 801, 901 may be comprised in the header of an Msg3 message for CCCH Access.

In some embodiments, the one or more fields may be an LCID field 801, 901. In some of these embodiments, some LCID may be in the range 00001-11001. In some other of these embodiments, the LCID may be set to either "11100", "11101" or "11110".

In other embodiments, the one or more fields may be a reserved bit 704.

The wireless device 130 is further configured to send the message comprising the one or more populated fields 704, 801, 901 to the network node 110 prior to the enquiry or the fetching of category and capability information of the wireless device 130 by the network node 110.

The wireless device 130 is configured to perform this action, e.g. by means of a sending module 1202 within the wireless device 130. The sending module 1202 may be the processor 1204 of the wireless device 130, or an application running on such processor.

In some embodiments, the wireless device 130 may comprise other modules 1203, which may be the processor 1204 of the wireless device 130, or an application running on such processor.

Figure 12:
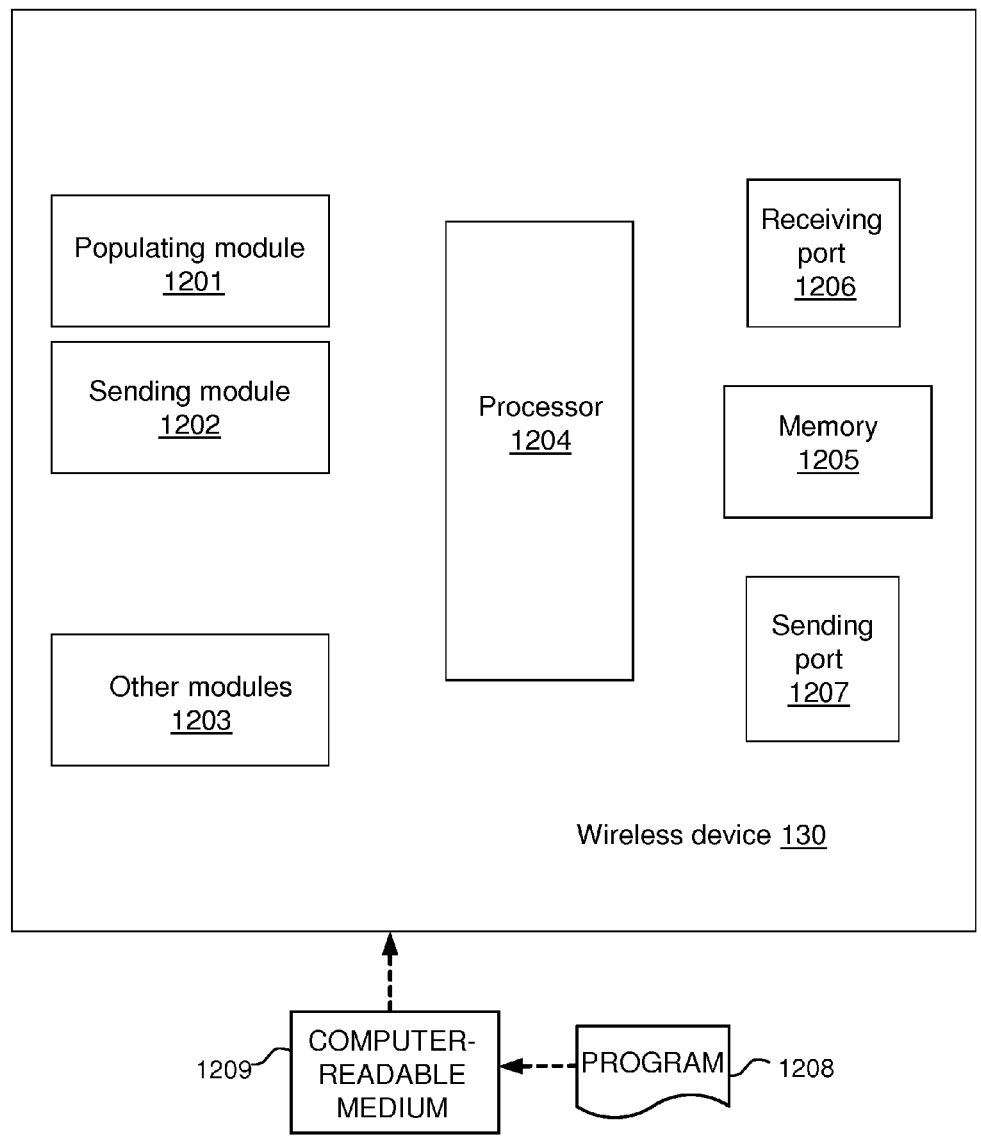
FIG. 12 is a schematic block diagram illustrating embodiments of a wireless device, according to embodiments herein.

The embodiments herein may be implemented through one or more processors, such as a processor 1204 in the wireless device 130 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 1205 comprising one or more memory units. The memory 1205 is arranged to be used to store obtained information, store data, configurations, schedulings, and applications etc. to perform the methods herein when being executed in the wireless device 130.

The wireless device 130 may comprise an interface unit to facilitate communications between the wireless device 130 and other nodes or devices, e.g., the network node 110. The interface may, for example, include a transceiver configured to transmit and receive radio signals over an air interface in accordance with a suitable standard.

In some embodiments, the wireless device 130 may receive information from, e.g., the network node 110, through a receiving port 1206. In some embodiments, the receiving port 1206 may be, for example, connected to one or more antennas in the wireless device 130. In other embodiments, the wireless device 130 may receive information from another structure in the wireless communications network 100 through the receiving port 1206. Since the receiving port 1206 may be in communication with the processor 1204, the receiving port 1206 may then send the received information to the processor 1204. The receiving port 1206 may also be configured to receive other information.

The processor 1204 in the wireless device 130 may be further configured to transmit or send information, to e.g., the network node 110, through a sending port 1207, which may be in communication with the processor 1204 and the memory 1205.

Those skilled in the art will also appreciate that the populating module 1201, the sending module 1202, and the other modules 1203 described above may refer to a combination of analog and digital modules, and/or one or more processors configured with software and/or firmware, e.g., stored in memory, that, when executed by the one or more processors such as the processor 1204, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1201-1203 described above may be implemented as one or more applications running on one or more processors such as the processor 1204.

Thus, the methods according to the embodiments described herein for the wireless device 130 may be respectively implemented by means of a computer program 1208 product, comprising instructions, i.e., software code portions, which, when executed on at least one processor 1204, cause the at least one processor 1204 to carry out the actions described herein, as performed by the wireless device 130. The computer program product may be stored on a computer-readable storage medium. The computer-readable storage medium 1209, having stored thereon the computer program 1208 may comprise instructions which, when executed on at least one processor 1204, cause the at least one processor 1204 to carry out the actions described herein, as performed by the wireless device 130. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

To perform the method actions described above in relation to FIGS. 10-11, the network node 110 is configured to determine the restriction of the wireless device 130. The network node 110 may comprise the following arrangement depicted in FIG. 13. As already mentioned, the network node 110 and the wireless device 130 are configured to operate in the wireless communications network 100.

The detailed description of some of the following corresponds to the same references provided above, in relation to the actions described for the network node 110, and will thus not be repeated here. For example, the wireless device 130 may be a low complexity wireless device.

The network node 110 is further configured to receive the existing message from the wireless device 130, the message comprising the one or more fields 704, 801, 901, wherein the one or more fields 704, 801, 901 have been populated by the wireless device 130 with the indication of the restriction of the wireless device 130. The receiving is configured to be performed prior to the enquiry or the fetching of category and capability information of the wireless device 130 by the network node 110. The network node 110 is configured to perform this action, e.g. by means of a receiving module 1301 within the network node 110. The receiving module 1301 may be a processor 1305 of the network node 110, or an application running on such processor.

In some embodiments, the restriction is the category restriction for low complexity wireless devices.

In some embodiments, the restriction is the TBS restriction, and the indication may be configured to simultaneously indicate a CCCH on UL-SCH, as well as the TBS restriction.

In some embodiments, the one or more fields 704, 801, 901 may be comprised in the header or subheader of a MAC message, and the one or more fields 704, 801, 901 may be configured to be populated with the indication, such that the size, or structure of the message remain unaltered by the added indication when populating the one or more fields 704, 801, 901.

The one or more fields may be comprised in the header of an Msg3 message for CCCH Access.

In some embodiments, the one or more fields may be an LCID field 801, 901. In some of these embodiments, some LCID may be in the range 00001-11001. In some other of these embodiments, the LCID may be set to either "11100", "11101" or "11110".

In other embodiments, the one or more fields may be a reserved bit 704.

The network node 110 is further configured to determine the restriction of the wireless device 130, based on the indication in the received message.

The network node 110 is configured to perform this action, e.g. by means of a determining module 1302 within the network node 110. The determining module 1302 may be the processor 1305 of the network node 110, or an application running on such processor.

The network node 110 may be further configured to schedule the wireless device 130 based on the determined restriction.

The network node 110 may be configured to perform this action, e.g. by means of a scheduling module 1303 within the network node 110. The scheduling module 1303 may be the processor 1005 of the network node 110, or an application running on such processor.

In some embodiments, the network node 110 may comprise other modules 1304, which may be the processor 1305 of the network node 110, or an application running on such processor.

Figure 13:
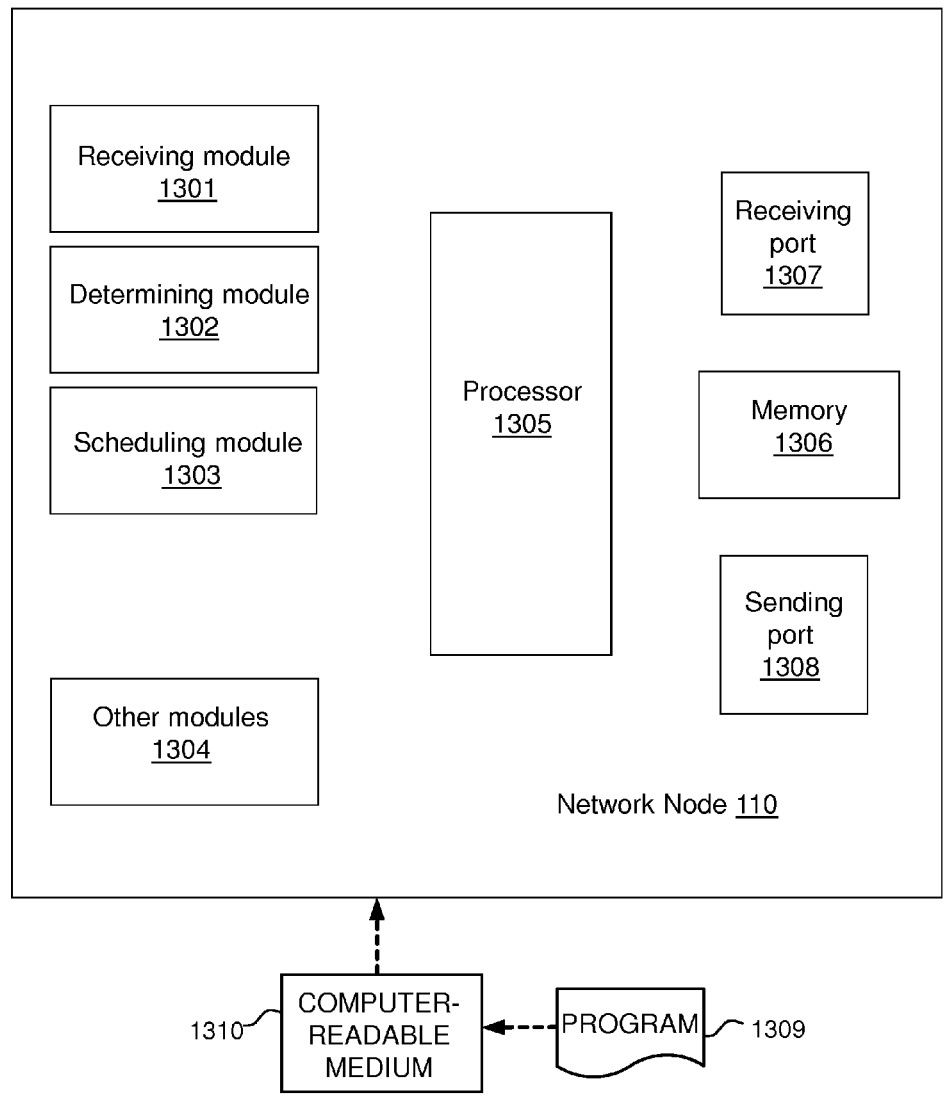
FIG. 13 is a schematic block diagram illustrating embodiments of a network node, according to embodiments herein.

The embodiments herein may be implemented through one or more processors, such as a processor 1305 in the network node 110 depicted in FIG. 13, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110 0.

The network node 110 may further comprise a memory 1306 comprising one or more memory units. The memory 1306 is arranged to be used to store obtained information, store data, configurations, schedulings, and applications etc. to perform the methods herein when being executed in the network node 110.

The network node 110 may comprise an interface unit to facilitate communications between the network node 110 and other nodes or devices, e.g., the wireless device 130. The interface may, for example, include a transceiver configured to transmit and receive radio signals over an air interface in accordance with a suitable standard In some embodiments, the network node 110 may receive information from, e.g., the wireless device 130 through a receiving port 1307. In some embodiments, the receiving port 1307 may be, for example, connected to one or more antennas in the network node 110. In other embodiments, the network node 110 may receive information from another structure in the wireless communications network 100 through the receiving port 1307. Since the receiving port 1307 may be in communication with the processor 1305, the receiving port 1307 may then send the received information to the processor 1305. The receiving port 1307 may also be configured to receive other information.

The processor 1305 in the network node 110 may be further configured to transmit or send information, to e.g., the wireless device 130, through a sending port 1308, which may be in communication with the processor 1305, and the memory 1306.

Those skilled in the art will also appreciate that the receiving module 1301, the determining module 1302, the scheduling module 1303, and the other modules 1304 described above may refer to a combination of analog and digital modules, and/or one or more processors configured with software and/or firmware, e.g., stored in memory, that, when executed by the one or more processors such as the processor 1305, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1301-1304 described above may be implemented as one or more applications running on one or more processors such as the processors 1305.

Thus, the methods according to the embodiments described herein for the network node 110 may be respectively implemented by means of a computer program 1309 product, comprising instructions, i.e., software code portions, which, when executed on at least one processor 1305, cause the at least one processor 1305 to carry out the actions described herein, as performed by the network node 110. The computer program product may be stored on a computer-readable storage medium. The computer-readable storage medium, having stored thereon the computer program 1309 may comprise instructions which, when executed on at least one processor 1305, cause the at least one processor 1305 to carry out the actions described herein, as performed by the network node 110. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method performed by a wireless device for sending a message comprising one or more populated fields to a network node, the wireless device and the network node operating in a wireless communications network, the method comprising:
   populating one or more fields comprised in an existing message to be sent to the network node with an indication of a restriction of the wireless device; and
   sending the message comprising the one or more populated fields to the network node prior to an enquiry or a fetching by the network node of category and capability information of the wireless device.

2. The method of claim 1, wherein the restriction is a category restriction for low complexity wireless devices.

3. The method of claim 1, wherein the restriction is a Transport Block Size (TBS) restriction, and wherein the indication simultaneously indicates a Common Control Channel (CCCH) on Uplink Shared CHannel (UL-SCH) as well as the TBS restriction.

4. The method of claim 1, wherein the one or more fields are comprised in a header or subheader of a Medium Access Control (MAC) message, and wherein the one or more fields are populated with the indication, such that the size, or structure of the message remain unaltered by the added indication when populating the one or more fields.

5. The method of claim 1, wherein the one or more fields are comprised in a header of an Msg3 message for Common Control Channel (CCCH) Access.

6. The method of claim 5, wherein the one or more fields are a Logical Channel ID (LCID) field.

7. The method of claim 6, wherein some LCID is in the range 00001-11001.

8. The method of claim 6, wherein the LCID is set to either "11100", "11101" or "11110".

9. The method of claim 5, wherein the one or more fields are a reserved bit.

10. The method of claim 1, wherein the wireless device is a low complexity wireless device.

11. A method performed by a network node for determining a restriction of a wireless device, the network node and the wireless device operating in a wireless communications network, the method comprising:

receiving an existing message from the wireless device, the message comprising one or more fields, wherein the one or more fields have been populated by the wireless device with an indication of a restriction of the wireless device, and wherein the receiving is performed prior to an enquiry or a fetching of category and capability information of the wireless device by the network node, and determining the restriction of the wireless device, based on the indication in the received message.

12. The method of claim 11, wherein the restriction is a category restriction for low complexity wireless devices.

13. The method of claim 11, wherein the restriction is a Transport Block Size (TBS) restriction, and wherein the indication simultaneously indicates a Common Control Channel (CCCH) on Uplink Shared CHannel (UL-SCH) as well as the TBS restriction.

14. The method of claim 11, further comprising scheduling the wireless device based on the determined restriction.

15. The method of claim 11, wherein the one or more fields are comprised in a header or subheader of a Medium Access Control (MAC) message, and wherein the one or more fields are populated with the indication, such that the size, or structure of the message remain unaltered by the added indication when populating the one or more fields.

16. The method of claim 11, wherein the one or more fields are comprised in a header of an Msg3 message for Common Control Channel (CCCH) Access.

17. The method of claim 16, wherein the one or more fields are a Logical Channel ID (LCID) field.

18. The method of claim 17, wherein some LCID is in the range 00001-11001.

19. The method of claim 17, wherein the LCID is set to either "11100", "11101" or "11110".

20. The method of claim 16, wherein the one or more fields are a reserved bit.

21. The method of claim 11, wherein the wireless device is a low complexity wireless device.

22. A wireless device configured to send a message comprising one or more populated fields to a network node, the wireless device and the network node being configured to operate in a wireless communications network, the wireless device being further configured to:

populate one or more fields comprised in an existing message configured to be sent to the network node with an indication of a restriction of the wireless device, and send the message comprising the one or more populated fields to the network node prior to an enquiry or a fetching of category and capability information of the wireless device by the network node.

23. The wireless device of claim 22, wherein the restriction is a category restriction for low complexity wireless devices.

24. The wireless device of claim 22, wherein the restriction is a Transport Block Size (TBS) restriction, and wherein the indication is configured to simultaneously indicate a Common Control Channel (CCCH) on Uplink Shared CHannel (UL-SCH) as well as the TBS restriction.

25. The wireless device of claim 22, wherein the one or more fields are comprised in a header or subheader of a Medium Access Control (MAC) message, and wherein the one or more fields are configured to be populated with the indication, such that the size, or structure of the message remain unaltered by the added indication when populating the one or more fields.

26. The wireless device of claim 22, wherein the one or more fields are comprised in a header of an Msg3 message for Common Control Channel (CCCH) Access.

27. A network node configured to determine a restriction of a wireless device, the network node and the wireless device being configured to operate in a wireless communications network, the network node being further configured to:

receive an existing message from the wireless device, the message comprising one or more fields, wherein the one or more fields have been populated by the wireless device with an indication of a restriction of the wireless device, and wherein the receiving is configured to be performed prior to an enquiry or a fetching of category and capability information of the wireless device by the network node, and determine the restriction of the wireless device, based on the indication in the received message.

28. The network node of claim 27, wherein the restriction is a category restriction for low complexity wireless devices.

29. The network node of claim 27, wherein the restriction is a Transport Block Size (TBS) restriction, and wherein the indication is configured to simultaneously indicate a Common Control Channel (CCCH) on Uplink Shared CHannel (UL-SCH) as well as the TBS restriction.

30. The network node of claim 27, further configured to:
schedule the wireless device based on the determined restriction.

31. The network node of claim 27, wherein the one or more fields are comprised in a header or subheader of a Medium Access Control (MAC) message, and wherein the one or more fields are configured to be populated with the indication, such that the size, or structure of the message remain unaltered by the added indication when populating the one or more fields.

32. The network node of claim 27, wherein the one or more fields are comprised in a header of an Msg3 message for Common Control Channel (CCCH) Access.

* * * * *

UNITED STATES PATENT AND TRADEMARK OFFICE
CERTIFICATE OF CORRECTION

PATENT NO.        : 9,661,492 B2
APPLICATION NO.   : 14/771728
DATED             : May 23, 2017
INVENTOR(S)       : Yavuz et al.

Page 1 of 1

It is certified that error appears in the above-identified patent and that said Letters Patent is hereby corrected as shown below:

In the Drawings

In Fig. 3, Sheet 2 of 11, delete "sub-header" and insert -- MAC sub-header --, therefor.

In the Specification

In Column 1, Line 64, delete "(3GPP)" and insert -- (3GPP), --, therefor.

In Column 6, Line 51, delete "network node 100" and insert -- network node 110 --, therefor.

In Column 8, Line 16, delete "TBS restriction'" and insert -- 'TBS restriction' --, therefor.

In Column 9, Line 38, delete "network 110" and insert -- network 100 --, therefor.

In Column 11, Line 44, delete "(a and b)" and insert -- a) and b) --, therefor.

In Column 11, Line 53, delete "etc...," and insert -- etc., --, therefor.

In Column 11, Line 64, delete "MAC SDU 402" and insert -- MAC SDU 505 --, therefor.

In Column 11, Line 66, delete "MAC SDU 402" and insert -- MAC SDU 505 --, therefor.

In Column 16, Lines 43-44, delete "network node 100" and insert -- network node 110 --, therefor.

In Column 21, Line 14, delete "110 0." and insert -- 110. --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*